(12) United States Patent
Maier et al.

(10) Patent No.: US 7,705,981 B2
(45) Date of Patent: *Apr. 27, 2010

(54) METHOD AND APPARATUS FOR SUPER MONTAGE LARGE AREA SPECTROSCOPIC IMAGING

(75) Inventors: John S. Maier, Pittsburgh, PA (US); Jason H. Neiss, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,344

(22) Filed: Jul. 25, 2008

(65) Prior Publication Data

US 2009/0021730 A1    Jan. 22, 2009

Related U.S. Application Data

(63) Continuation of application No. 11/228,382, filed on Sep. 19, 2005, now Pat. No. 7,479,966.

(51) Int. Cl.
*G01J 3/44* (2006.01)
(52) U.S. Cl. ..................................... 356/301
(58) Field of Classification Search ................. 356/301; 382/162
See application file for complete search history.

(56) References Cited

U.S. PATENT DOCUMENTS

| 4,848,877 | A |  | 7/1989 | Miller |
| 5,859,702 | A |  | 1/1999 | Lindblom |
| 6,313,467 | B1 |  | 11/2001 | Shafer et al. |
| 7,072,509 | B2 | * | 7/2006 | Hunter et al. ............... 382/164 |
| 2001/0052979 | A1 |  | 12/2001 | Treado et al. |
| 2004/0028271 | A1 | * | 2/2004 | Pollard et al. ............... 382/162 |
| 2005/0007584 | A1 | * | 1/2005 | Mansfield et al. ........... 356/301 |
| 2005/0046850 | A1 |  | 3/2005 | Chow |
| 2005/0058352 | A1 |  | 3/2005 | Deliwala |
| 2005/0157294 | A1 |  | 7/2005 | Hopkins et al. |
| 2006/0098206 | A1 |  | 5/2006 | Kim et al. |
| 2006/0268266 | A1 |  | 11/2006 | Gardner et al. |
| 2007/0216898 | A1 |  | 9/2007 | Gardner |

* cited by examiner

*Primary Examiner*—Kara E Geisel
(74) *Attorney, Agent, or Firm*—Duane Morris LLP

(57) ABSTRACT

The disclosure relates to Method and Apparatus for Super Montage Large area Spectroscopic Imaging. In one embodiment of the disclosure, a method for producing a spectroscopic image of an object includes the steps of (a) irradiating the object with light to thereby produce from the object scattered and/or emitted (interchangeably "scattered") light for each of a plurality of wavelengths; (b) producing separately for each of the plurality of wavelengths a plurality of substantially contiguous sub-images of the object; (c) compensating for spatial aberrations in ones of the sub-images for a select one of the plurality of wavelengths; (d) compensating for intensity aberrations between ones of the substantially contiguous sub-images for one of the plurality of wavelengths; and (e) combining the sub-images for the select one wavelength to thereby produce said spectroscopic image of the object.

21 Claims, 4 Drawing Sheets

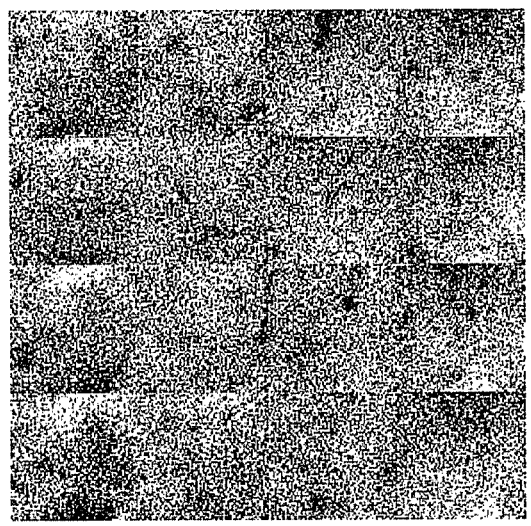
FIG. 2c Post LISAR and NMC
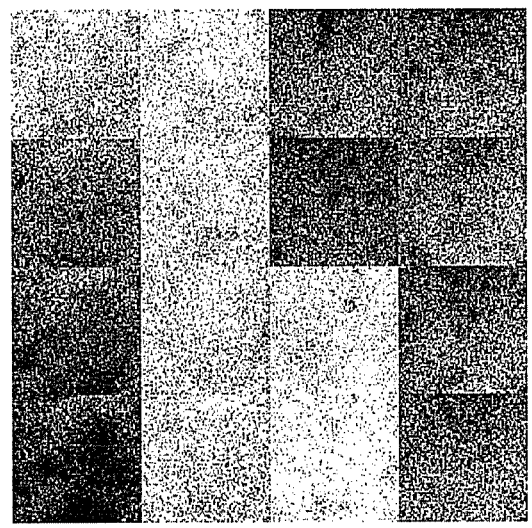
FIG. 2b Post LISAR
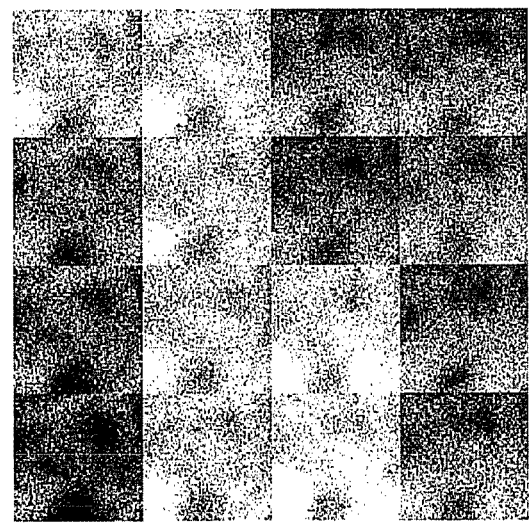
FIG. 2a Bias normalized

METHOD AND APPARATUS FOR SUPER MONTAGE LARGE AREA SPECTROSCOPIC IMAGING

The instant application claims the filing-date benefit of Provisional Application No. 60/575,090 filed May 5, 2004, the specifications of which is incorporated herein in its entirety.

BACKGROUND

Spectroscopic imaging combines digital imaging and molecular spectroscopy techniques, which can include Raman scattering, fluorescence, photoluminescence, ultraviolet; visible and infrared absorption spectroscopies. When applied to the chemical analysis of materials, spectroscopic imaging is commonly referred to as chemical imaging. Instruments for performing spectroscopic (i.e. chemical) imaging typically comprise image gathering optics, focal plane array imaging detectors and imaging spectrometers.

In general, the sample size determines the choice of image gathering optic. For example, a microscope is typically employed for the analysis of sub micron to millimeter spatial dimension samples. For larger objects, in the range of millimeter to meter dimensions, macro lens optics are appropriate. For samples located within relatively inaccessible environments, flexible fiberscopes or rigid borescopes can be employed. For very large scale objects, such as planetary objects, telescopes are appropriate image gathering optics.

For detection of images formed by the various optical systems, two-dimensional, imaging focal plane array (FPA) detectors are typically employed. The choice of FPA detector is governed by the spectroscopic technique employed to characterize the sample of interest. For example, silicon (Si) charge-coupled device (CCD) detectors or CMOS detectors are typically employed with visible wavelength fluorescence and Raman spectroscopic imaging systems, while indium gallium arsenide (InGaAs) FPA detectors are typically employed with near-infrared spectroscopic imaging systems.

Spectroscopic imaging can be implemented by one of several methods. First, dispersive point or line illumination spectrometer can be raster-scanned over the sample area to create a map of the spectroscopic content. Second, spectra can be collected over the entire area simultaneously, using an active optical imaging filter such as AOTF or LCTF. Here the materials in these optical filters are actively aligned by applied voltages or acoustic fields to produce the desired bandpass and transmission function.

Raster scanning the sample with a dispersive spectrometer having a stable transmission is rather time consuming. The second approach, while providing a more expeditious scanning method, can introduce inaccuracies caused by temperature variation and device-specific characteristics. Any inconsistency in the material and its orientation over the optical surface will modify the transmission function both spatially and over time. Accordingly, there is a need for a method and apparatus for super montage rapid imaging system to provide spectroscopic image of a large area.

SUMMARY OF THE DISCLOSURE

The disclosure relates to a method and apparatus for super montage rapid imaging system. In one embodiment of the disclosure, a method for producing a spectroscopic image of an object includes the steps of (a) irradiating the object with light to thereby produce from the object scattered and/or emitted (interchangeably "scattered") light for each of a plurality of wavelengths; (b) producing separately for each of the plurality of wavelengths a plurality of substantially contiguous sub-images of the object; (c) compensating for spatial aberrations in ones of the sub-images for a select one of the plurality of wavelengths; (d) compensating for intensity aberrations between ones of the substantially contiguous sub-images for one of the plurality of wavelengths; and (e) combining the sub-images for the select one wavelength to thereby produce said spectroscopic image of the object.

In another embodiment, the disclosure relates to an improved method for reducing aberrations in a spectroscopic image comprising plural substantially contiguous sub-images having plural pixels each pixel having an initial intensity value, where the plural sub-images are each produced using an active optical imaging filter, the improvement comprising the steps of (a) compensating for spatial aberrations; and (b) compensating for intensity aberrations.

In still another embodiment, the disclosure relates to a spectroscope for irradiating an object with light to thereby produce from the object scattered light for each of a plurality of wavelengths and to produce separately for each of the plurality of wavelengths a plurality of substantially contiguous sub-images of the object. The spectroscope includes a processor programmed to perform a plurality of executable instructions, the instructions comprising: (a) compensating for spatial aberrations in ones of the sub-images for a select one of the plurality of wavelengths; (b) compensating for intensity aberrations between ones of the substantially contiguous sub-images for one of the plurality of wavelengths; and (c) combining the sub-images for the select one wavelength to thereby produce said spectroscopic image of the object.

In another embodiment, the disclosure relates to a system for reducing aberrations in a spectroscopic image comprising plural substantially contiguous sub-images having plural pixels each pixel having an initial intensity value, where the plural sub-images are each produced using an active optical imaging filter, and where the system includes a processor programmed to perform a plurality of executable instructions. The instructions including: (a) compensating for spatial aberrations; and (b) compensating for intensity aberrations.

In still another embodiment, the disclosure relates to a method for producing a corrected spectroscopic sub-image of an object comprising the steps of (a) irradiating the object with light to thereby produce from the object scattered light for each of a plurality of wavelengths; (b) producing separately for each of the plurality of wavelengths a plurality of substantially contiguous sub-images of the object; (c) compensating for spatial aberrations in ones of the sub-images for a select one of the plurality of wavelengths; and (d) compensating for intensity aberrations between ones of the substantially contiguous sub-images for one of the plurality of wavelengths.

BRIEF DESCRIPTION OF THE DRAWINGS

FIGS. 2A-2C show a super montage image as processed through LISAR and NMC according to an embodiment of the disclosure;

DETAILED DESCRIPTION

The disclosure generally relates to addressing different aspects of LCTF transmission aberrations. Applicants have identified at least two processes for addressing different aspects of LCTF transmission aberrations. A first process is directed to the spatial aberration of the LCTF (the LISAR process) and the second process is directed to the discontinuous transmission pattern of the LCTF as a function of wavelength (the NMC process).

Figure 1:
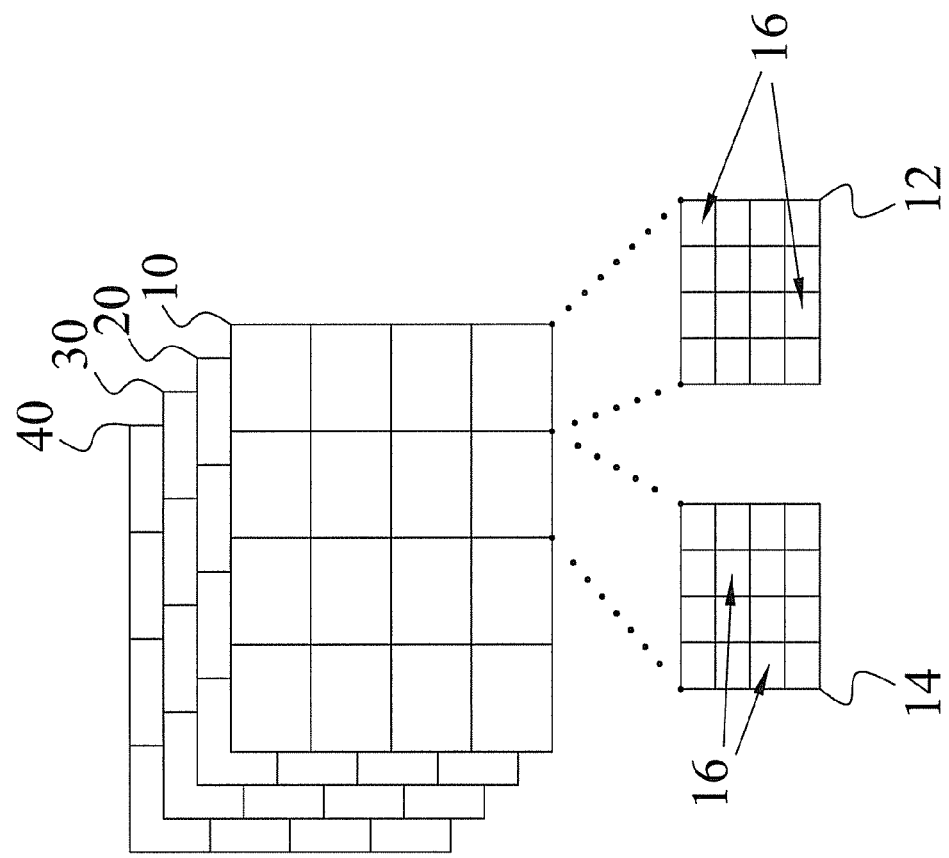
FIG. 1 is a schematic representation of a super montage or large area representation of a Raman image.

FIG. 1 is a schematic representation of a super montage or large area representation of a Raman image. In a super montage a number of large area images are combined to form a collection or a montage. The montage can cover an extensive area of the sample in the X and Y coordinates as shown in FIG. 1. In addition, the montage can include images of the sample collected at different wavelengths ($\lambda$). Thus, a combination of images 10, 20, 30 and 40 over a sample occupying a space forms the montage. Each image 10 contains a combination of several sub-images 12, 14 at a given wavelength. Sub-images 12, 14 comprise a plurality of pixels 16. Each pixel 16 identifies a wavelength $\lambda$ having a particular intensity corresponding to the Raman properties of the underlying sample.

FIGS. 2A-2C show a super montage image of a sample as processed through LISAR and NMC according to an embodiment of the disclosure. Particularly, FIG. 2A shows bias normalized super montage image 200. Image 200 includes 16 sub-images. Each sub-image is shown as an integrated square. Each sub-image further comprises a multitude of pixels each having a different intensity. By examining the bias normalized montage of FIG. 2A several aberrations or patterns of aberrations emerge.

Generally, the aberrations can be categorized into one of two categories. The first pattern of aberration is a repeating pattern that seems imprinted on each field of view ("FOV") of each sub-image. Moreover, it appears differently at different LCTF set points of the LCTF. Applicants have identified aberration patterns of the first type as LCTF spatial aberration. The second type aberration pattern is the variable brightness of the FOV within the montage. Thus, in one embodiment, the disclosure relates to identifying and compensating for each of the first- and second-type aberration patterns.

Applicants have observed that in a montage formed from multiple FOV images, each FOV had a characteristic spatial pattern that seemed to repeat in every sub-frame of the montage. Moreover, the aberration appeared different at different LCTF set points. This aberration can be seen with reference to FIGS. 2A and 2B. In FIG. 2A the montage Raman image 200 is bias normalized. Each of the sub-images (for example, sub-images 210 and 220) includes fading on the top left corner of the image. This aberration appears in virtually every sub-image and, as stated, it is considered to be a characteristic of the LCTF.

According to one embodiment of the disclosure, LCTF Inhomogeneous Spatial Aberration Removal ("LISAR") filtration process comprises the steps of (1) for each pixel in a group of pixels, defining a mean intensity value and a spatially-filtered mean intensity value; (2) determining an overall average of the spatially-filtered pixel intensity values; (3) for each pixel in the selected group of pixels, determining the difference in intensity value between the mean intensity value and the overall average intensity value; and (4) for each pixel in a sub-image subtracting the intensity value of step (3) from the original intensity value.

Referring to FIG. 1, the exemplary LISAR steps can be illustrated as follows. First, for each pixel 16 in a group of pixels 14, a mean intensity value is determined. In one exemplary embodiment, the mean intensity value can be determined by calculating the intensity value for a group of pixels (e.g., all pixels positioned at position (1, 1) within each sub-image. The first step can be followed by determining a spatially-filtered mean intensity value for each pixel in the selected group of pixels. Referring to FIG. 1, the step of determining a spatially-filtered mean intensity value can be accomplished by obtaining a mathematical average of a pixel's (e.g., pixel 16) intensity value as compared with its immediately-adjacent pixels. Using the spatially-filtered mean intensity thus obtained, an overall average of the spatially-filtered pixel intensity values for the sub-image can be determined. Next, the overall average of the spatially-filtered mean intensity for each pixel 16 of the sub-image 14 is subtracted from the spatially-filtered mean intensity value of the corresponding pixel 16 of the sub-image 14 to define an interim intensity value for each pixel 16 in sub-image 14. Finally, the interim intensity value at each pixel is subtracted from the original intensity value at the corresponding pixel. Replacing the original intensity value for each pixel 16 in sub-image 14 with the final intensity value completes the LISAR filtration process.

Referring again to FIG. 2, FIG. 2A shows bias normalized super montage image 200. FIG. 2B shows the image of FIG. 2A post LISAR filtration process. It can be readily seen from FIGS. 2A and 2B that LISAR filtration technique effectively removes spatial aberration that appear in many of the sub-images of FIG. 2A.

Figure 3:
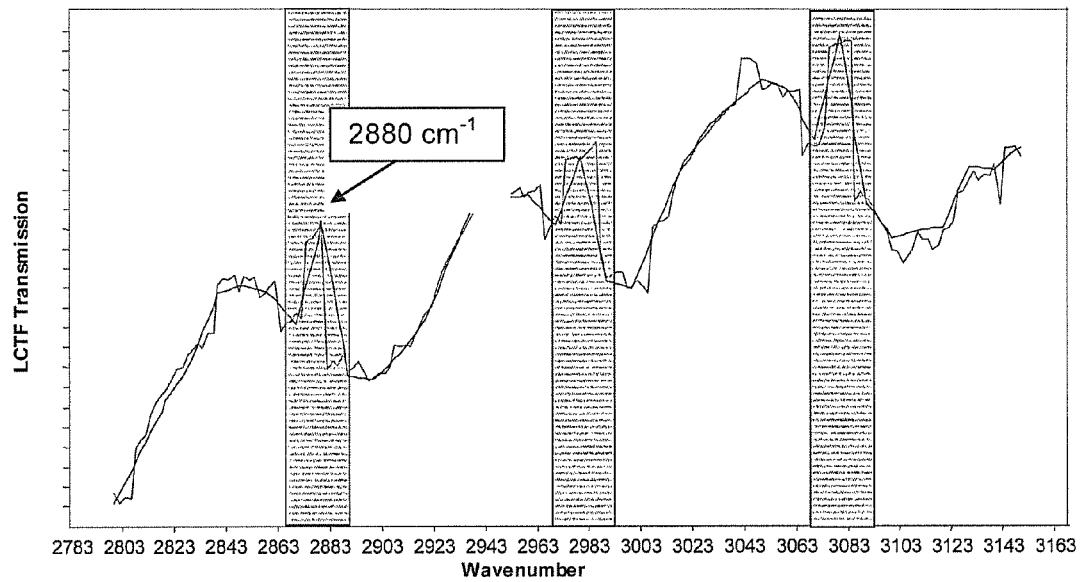
FIG. 3 shows the transmission spectrum of an exemplary LCTF device.

Once the problems attributed to spatial aberration are addressed, the montage images may include sub-images having different intensities. For example, referring to FIG. 2B, it can be seen that certain sub-images are substantially lighter (i.e., have higher intensity) than other sub-images. This aberration can stem from the non-uniform transmission of the LCTF as a function of bandpass setting. The transmission function of the LCTF is considered to have a discontinuous transmission as a function of wavelength. FIG. 3 shows the transmission spectrum of an exemplary LCTF device. Referring to FIG. 3, the sharp transitions in the highlighted regions are considered to contribute to the aberration.

Addressing this problem according to one embodiment of the disclosure includes compensating for intensity aberrations between substantially contiguous sub-images for one of several wavelengths and combining the selected wavelengths to produce a spectroscopic image of the object. The discontinuities in transmission do not appear constant in time, in part due to temperature fluctuation of the instrument.

Figure 4:
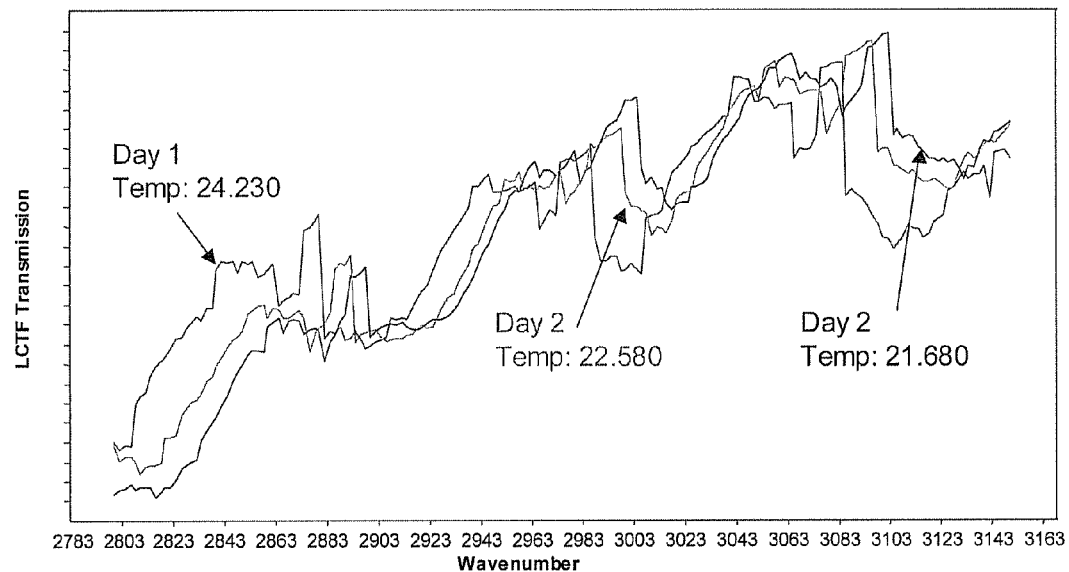
FIG. 4 shows the effect of temperature on LCTF performance.

FIG. 4 shows the effect of temperature on LCTF performance. Referring to FIG. 4, the identical experiment was performed using the same high-resolution instrument at three different occasions under different LCTF temperatures. The overall structure of the curves is similar, with sharp discontinuities in a similar pattern across the experiments' wavelengths. However, the spectrum seems to be translated left to right depending on the temperature. This aberration is of particular importance when a series of contiguous fields of view are imaged in succession over a relatively long period of time (several hours). Over the course of the experiment, temperature fluctuations of the apparatus will lead to shifting of the above-spectrum from right to left. If during the experimental setup one of the chosen bandpass settings is near a discontinuity, the filter may have dramatically different transmission characteristics at different temperatures.

A study of the montage experimental data shows that the frames with discontinuous brightness occur in the regions identified in FIG. 4. As stated, the discontinuities in the brightness can be attributed to temperature characteristics of the device. The device characteristics are particularly important for sampling and data interpretation. For example, for Raman imaging utilizing a narrow band the device's temperature dependence can cause a substantial bandpass shift.

The abnormalities observed in the data stems from the non-uniformity of the LCTF transmission over the entire area of the filter. Without wishing to be bound to a specific theory, the following aspects are considered to cause the spatial non-uniformity (1) thickness non-uniformity of liquid crystal cells over certain aperture; (2) different material with different thermal and mechanical expansion/contraction characteristics coupled with the effect of mechanical strain on the liquid crystal components which can lead to stress-induced birefringence effect; and (3) the mismatch of refractive indices of the layers which creates high-order interference pattern when the LCTF is tuned to certain wavelengths (e.g., 700 nm). The system used as a prototype showed about 2%±0.5 over the field of view. Although small, the pre-processing steps of bias correction and normalization can amplify the effect such that the spatial variability in transmission dominates the dynamic range of the data after correction.

The above-disclosed principles can also be used to address and remove aberrations appearing in certain fluorescence-illuminated imaging systems. Additionally, the same principles can be used to address aberrations caused by non-uniform illumination of the sample. A baseline operation can, on occasion, be substituted for the LISAR process.

According to one embodiment of the disclosure, a method of compensating for intensity aberrations between sub-images of a mosaic image of a sample at a number of wavelengths ("NMC") includes normalizing the intensity value of the pixels of a sub-image and re-centering a mean intensity value for the select group of pixels in a sub-image.

In an exemplary embodiment normalizing the intensity value includes several steps. First, the norm intensity value of all pixels in a sub-image and the norm intensity value for all pixels in each of the corresponding sub-images are defined. For the normalization step, the term corresponding pixels refers to pixels located at the same relative position but at a different wavelength. Second, for each pixel in a select group of pixels, the intensity value can be divided by the norm to obtain a normalized intensity value. Finally, the normalized intensity value can be multiplied by the number of pixels in a sub-image and the number of wavelengths to obtain the global normalized value.

Figure 5:
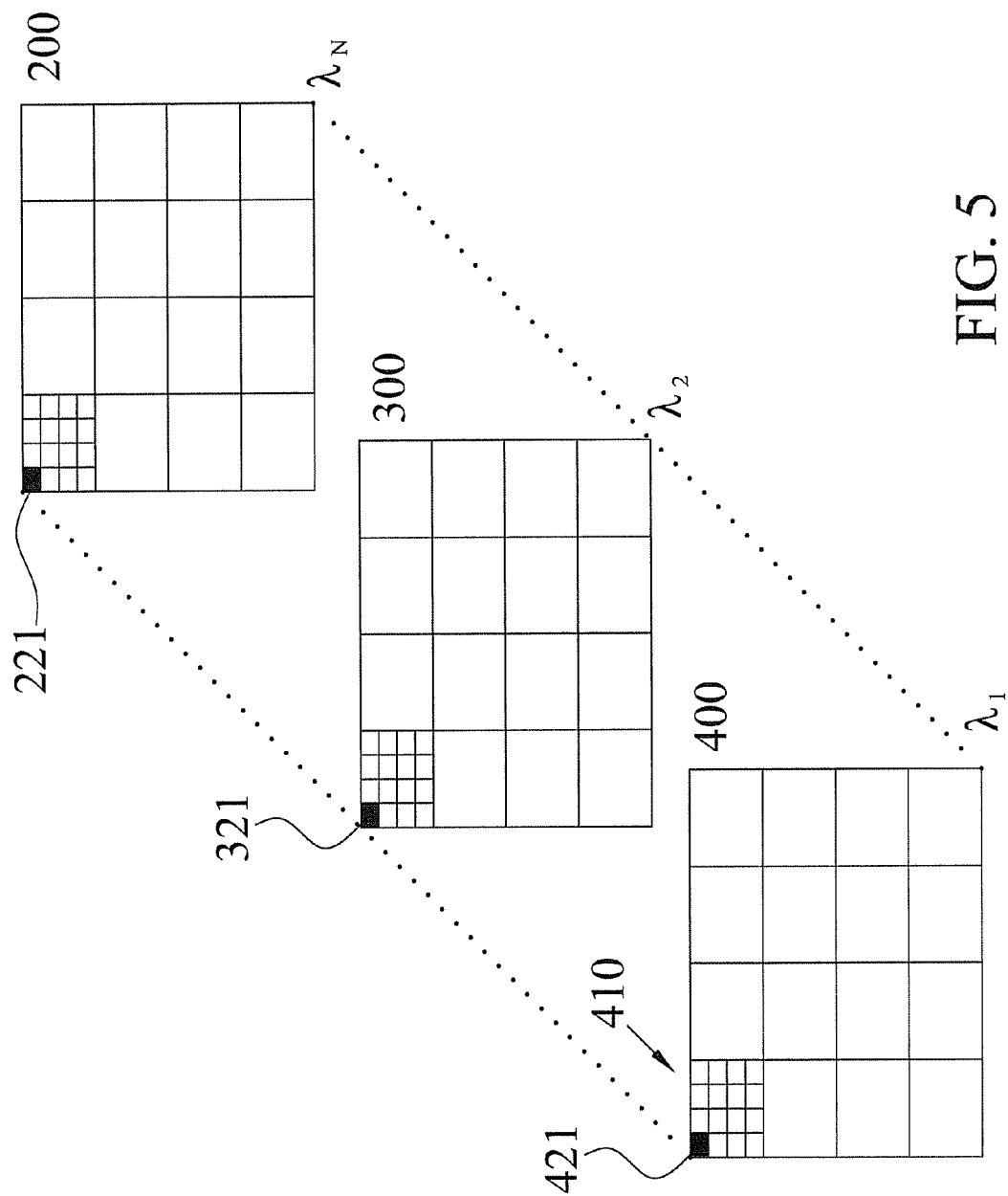
FIG. 5 schematically illustrates the normalization process according to one embodiment of the disclosure.

FIG. 5 schematically illustrates the normalization process according to one embodiment of the disclosure. Referring to FIG. 5, images 200, 300 and 400 represent a sample at different wavelengths. In an exemplary embodiment, there may be sixteen sub-images defining the sample at sixteen different wavelengths. In one exemplary embodiment, each image can further comprise at least sixteen sub-images where each sub-image further includes sixteen pixels. By way of example, image 400 is shown with sixteen sub-images. Sub-image 410 also includes sixteen pixels 421. Each pixel defines a particular pixel intensity $I_0$. As a first step of an exemplary normalization process the intensity value for each pixel is normalized with respect to its subimage neighbor pixels and corresponding wavelength pixels. Referring to FIG. 5, the intensity value of pixel 421 can be normalized ($I_{norm}$) in view of all of its corresponding pixels (321, 221, etc.) from the other fifteen sub-images (300, 200, etc.) In other words, normalized intensity for a given pixel can be defined in terms of all of its corresponding pixel intensity values:

$$I_{norm} = \sqrt{\left(\sum_\lambda \sum_x \sum_y I(x, y, \lambda)^2\right)}$$

Next, the ratio of ($I_{0\ norm} = I_0/I_{norm}$) can be determined. This process can be repeated for each of the sixteen exemplary pixels in each sub-image. Using the values of $I_{0\ norm}$ a sub-image can be formed having sixteen pixels where the intensity of each pixel is normalized as exemplified by $I_{0\ norm}$. For each pixel, the value of $I_{0\ norm}$ can be multiplied by the number of pixels in the sub-image and the wavelengths corresponding to each sub-image. In the exemplary embodiment of sixteen sub-images each having sixteen pixels, this would translated to $I_{0\ norm} \times 16 \times 16 \times 3$. The resulting value is the global normalized value.

The process of re-centering a mean intensity value for the select group of pixels in a sub-image includes obtaining the global mean intensity value as a function of the initial intensity ($I_0$) value of pixels in plural sub-images for a predetermined wavelength. The global mean intensity value ($I_{global\ mean}$) can be defined as a function of all sub-images having the same wavelength. Next, a local mean intensity ($I_{local\ mean}$) value can be obtained as a function of initial intensity value ($I_0$) for one sub-image. For each pixel the intensity difference ($I_\Delta$) between the original pixel intensity value ($I_0$) and the local mean intensity value ($I_{local\ mean}$) can be obtained. Finally, the re-centered intensity value ($I_{re-centered}$) can be obtained by combining the $I_\Delta$ and $I_{global\ mean}$. Using the re-centered intensity value ($I_{re-centered}$) one or more of the sub-images can be corrected.

Referring once again to FIG. 2, FIGS. 2B and 2C show a super montage image as processed by the NMC process according to an embodiment of the disclosure. As stated, FIG. 2B shows post LISAR image. Applying the NMC filtration process as described above, yields the embodiment shown in FIG. 2C. A comparison of FIGS. 2A and 2C illustrate the advantages of the principles disclosed herein in providing a more coherent image of the sample. The LISAR and NMC processes substantially reduce spatial aberration and compensate for intensity aberrations in a spectroscopic image from plural sub-images each having many pixels. While the LISAR process can compensate for the spatial aberrations, the NMC process can reduce intensity aberrations.

While the principles of the disclosure have been described in relation to specific exemplary embodiments, it is noted that Applicants' disclosure is not limited thereto and include any permutation, variation and modification to the principles disclosed herein.

What is claimed is:

1. A method for producing a spectroscopic image of an object comprising the steps of: (a) producing separately for each of the plurality of wavelengths a plurality of substantially contiguous sub-images of the object; (b) compensating for spatial aberrations in ones of the sub-images for a select one of the plurality of wavelengths; (c) compensating for intensity aberrations between ones of the substantially contiguous sub-images for one of the plurality of wavelengths; and (d) combining the sub-images for the select one wavelength to thereby produce said spectroscopic image of the object.

2. The method of claim 1 wherein the spectroscopic image is a Raman image.

3. A method for producing a corrected spectroscopic sub-image of an object comprising the steps of: (a) producing separately for each of the plurality of wavelengths a plurality of substantially contiguous sub-images of the object; (b) compensating for spatial aberrations in ones of the sub-images for a select one of the plurality of wavelengths; and (c) compensating for intensity aberrations between ones of the substantially contiguous sub-images for one of the plurality of wavelengths.

4. The method of claim 3 wherein the spectroscopic sub-image is a Raman image.

5. In a method for reducing aberrations in a spectroscopic image comprising plural substantially contiguous sub-images having plural pixels each pixel having an initial intensity value, where the plural sub-images are each produced using an active optical imaging filter, the improvement comprising the steps of: (a) compensating for spatial aberrations including determining a difference in intensity value between a spatially-filtered mean intensity value and an overall average of the spatially-filtered mean intensity value; and (b) compensating for intensity aberrations.

6. The method of claim 5 wherein the spectroscopic image is a Raman image.

7. In a method for reducing aberrations in a spectroscopic image comprising plural substantially contiguous sub-images having plural pixels each pixel having an initial intensity value, where the plural sub-images are each produced using an active optical imaging filter, the improvement comprising the steps of: (a) compensating for spatial aberrations; and (b) compensating for intensity aberrations including the steps of: (1) normalizing an intensity value for a select group of pixels in one sub-image; and (2) recentering a mean intensity value for the select group of pixels.

8. The method of claim 7 wherein the spectroscopic image is a Raman image.

9. A system for producing a spectroscopic image of an object comprising: circuitry for producing separately for each of a plurality of wavelengths a plurality of substantially contiguous sub-images of the object; circuitry for compensating for spatial aberrations in ones of the sub-images for a select one of the plurality of wavelengths; circuitry for compensating for intensity aberrations between ones of the substantially contiguous sub-images for one of the plurality of wavelengths; and circuitry for combining the sub-images for the select one wavelength to thereby produce said spectroscopic image of the object.

10. The system of claim 9 further comprising a light source for irradiating the object with light to thereby produce from the object scattered or emitted light for each of the plurality of wavelengths.

11. The system of claim 9 wherein each sub-image comprises plural pixels each having an initial intensity value, and said circuitry for compensating for intensity aberrations includes: circuitry for normalizing an intensity value for a select group of pixels in one sub-image as a function of an intensity value for selected corresponding pixels; and circuitry for recentering a mean intensity value for the select group of pixels.

12. The system of claim 9 wherein the spectroscopic image is a Raman image.

13. In a system for reducing aberrations in a spectroscopic image comprising plural substantially contiguous sub-images having plural pixels each pixel having an initial intensity value, where the plural sub-images are each produced using an active optical imaging filter, the improvement comprising: circuitry for compensating for spatial aberrations by determining a difference in intensity value between a spatially-filtered mean intensity value and an overall average of the spatially-filtered mean intensity value; and circuitry for compensating for intensity aberrations.

14. The system of claim 13 wherein the spectroscopic image is a Raman image.

15. In a system for reducing aberrations in a spectroscopic image comprising plural substantially contiguous sub-images having plural pixels each pixel having an initial intensity value, where the plural sub-images are each produced using an active optical imaging filter, the improvement comprising: circuitry for compensating for spatial aberrations; and circuitry for compensating for intensity aberrations by normalizing an intensity value for a select group of pixels in one sub-image and recentering a mean intensity value for the select group of pixels.

16. The system of claim 15 wherein the spectroscopic image is a Raman image.

17. A spectroscope for irradiating an object with light to thereby produce from the object scattered or emitted light for each of a plurality of wavelengths and to produce separately for each of the plurality of wavelengths a plurality of substantially contiguous sub-images of the object, where the spectroscope comprises: circuitry for compensating for spatial aberrations in ones of the sub-images for a select one of the plurality of wavelengths; circuitry for compensating for intensity aberrations between ones of the substantially contiguous sub-images for one of the plurality of wavelengths; and circuitry for combining the sub-images for the select one wavelength to thereby produce said spectroscopic image of the object.

18. A system for producing a corrected spectroscopic sub-image of an object comprising: circuitry for producing separately for each of a plurality of wavelengths a plurality of substantially contiguous sub-images of the object; circuitry for compensating for spatial aberrations in ones of the sub-images for a select one of the plurality of wavelengths; and circuitry for compensating for intensity aberrations between ones of the substantially contiguous sub-images for one of the plurality of wavelengths.

19. The system of claim 18 further comprising a light source for irradiating the object with light to thereby produce from the object scattered or emitted light for each of the plurality of wavelengths.

20. The system of claim 18 wherein each sub-image comprises plural pixels each having an initial intensity value, and said circuitry for compensating for intensity aberrations includes: circuitry for normalizing an intensity value for a select group of pixels in one sub-image as a function of an intensity value for selected corresponding pixels; and circuitry for recentering a mean intensity value for the select group of pixels.

21. The system of claim 18 wherein the spectrographic sub-image is a Raman image.

* * * * *